July 30, 1946.    S. BOUSKY    2,405,012

TWO PHASE MOTOR

Filed Jan. 17, 1944

INVENTOR.
SAMUEL BOUSKY
BY Frank H. Harmon
ATTORNEY

Patented July 30, 1946

2,405,012

UNITED STATES PATENT OFFICE 2,405,012

TWO-PHASE MOTOR

Samuel Bousky, Shaker Heights, Ohio, assignor, by mesne assignments, to Jack & Heintz Precision Industries, Inc., Cleveland, Ohio, a corporation of Delaware Application January 17, 1944, Serial No. 518,539

4 Claims. (Cl. 172—120)

This invention relates to two phase electric motors.

The general object of the invention is to provide a novel improved construction for two phase motors, which is extremely simple and economical to manufacture, and which is especially suited to miniature motors of very small size and power ratings.

These and other objects and advantages reside in the novel construction of parts, the combination thereof, and the mode of operation, as will become apparent as the specification proceeds in connection with the accompanying drawing in which.

Figure 1:
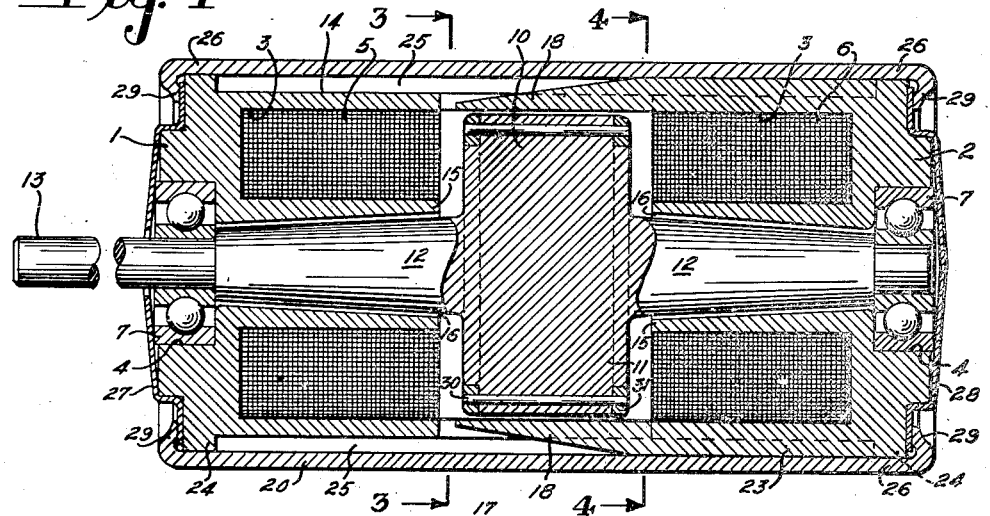
Figure 1 is a longitudinal sectional view through a preferred embodiment of my novel construction.
Figure 2:
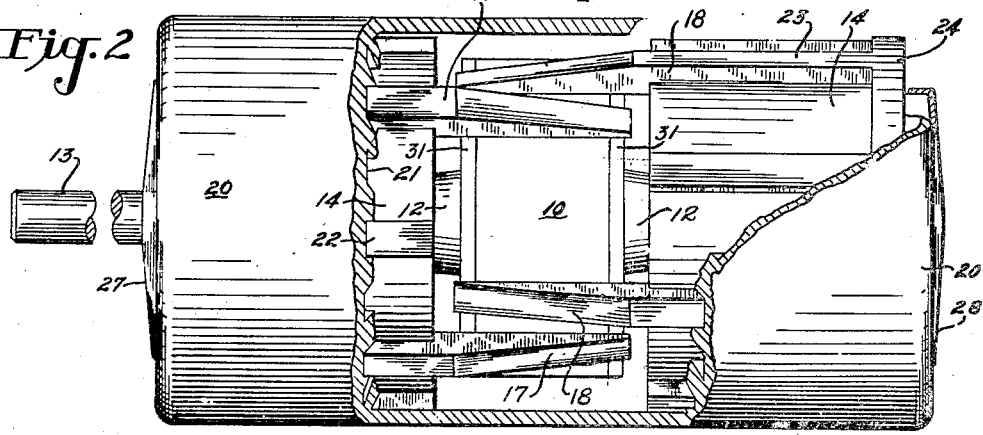
Figure 2 is an elevational view with part of the casing broken away to show the field pieces and rotor.
Figure 3:
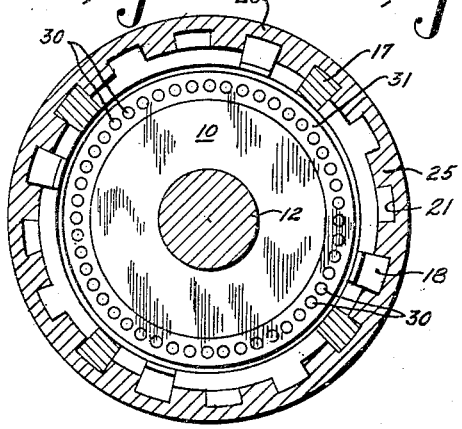
Figure 3 is a cross sectional view taken on the line 3—3 of Figure 1.
Figure 4:
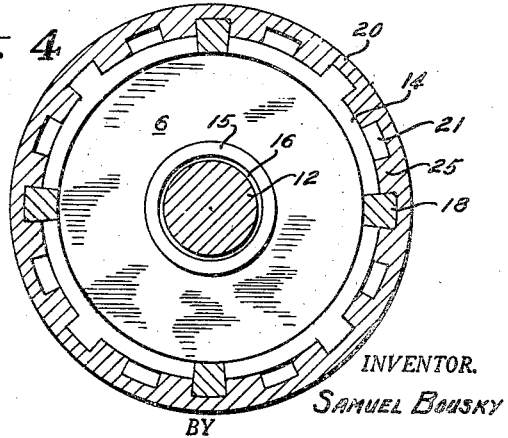
Figure 4 is a cross sectional view taken on the line 4—4 of Figure 1.

Referring more particularly to the drawing illustrating a preferred embodiment of the invention, the numerals 1 and 2 indicate a pair of identical magnetic field pieces having oppositely disposed and inwardly directed cup-shaped coil recesses 3, and oppositely disposed and outwardly directed bearing recesses 4. The coil recesses contain phase windings 5 and 6, each comprising a single coil of wire. A pair of bearing assemblies 7 in the respective bearing recesses mount a rotor 10 concentrically with the two field pieces, the rotor having an enlarged cylindrical central portion 11 with tapering end portions 12, 12 one of which terminates in an external shaft portion 13. The coil recess 3 in each pole piece is seen to be bounded on the outside by a cylindrical wall portion 14, and on the inside by a central cylindrical wall portion 15 defining an opening 16 to accommodate one of the tapered ends 12 of the rotor. The external wall portion 14 of the field piece 1 is extended in a plurality of spaced projections or pole pieces 17 of a length to overlie and enclose the central portion 11 of the rotor, and the field piece 2 is similarly provided with a plurality of spaced projections 18 disposed in interfingered relation with the projections 17 in the manner shown in Figure 2.

Energization of the coil in a field piece produces at any given instant a magnetic pole in the central portion 15 and an opposite pole in the outer wall 14 carrying the projections 17 and 18. All the projections 17 are therefore of similar polarity at any instant, and likewise the projections 18 have a common polarity. Thus, when the coils 5 and 6 are energized from the respective phase of a two phase alternating current supply, the projections 17 and 18 constitute active pole tips effective to produce a rotating magnetic field around the rotor. The number of projections may be selected to produce the rotational speed desired.

The field pieces 1 and 2 are maintained in the correct relationship and alignment by a cylindrical outer casing 20 having internal grooves 21 extending longitudinally thereof. The projections 17 and 18 and the raised ribs 22 and 23 extending in continuation thereof, lie in alternate grooves 21. Each field piece has an end flange or rim 24 extending between the raised ribs. If the field piece is formed by a casting process this flange may be cast integrally therewith, as shown, and if the field piece is machined from tubular stock the flange 24 may take the form of a ring pressed on so as to be rigidly united therewith. The lands 25 between the grooves 21 are terminated short of the ends of the housing 20 to provide thin walled end portions 26, 26 for receiving the flanges 24, 24. In assembling the motor the field pieces may be inserted in both ends of the housing 20 as far as they will go, with flanges 24, 24 abutting the ends of lands 25 which will properly position the projections 17 and 18 longitudinally with respect to each other and the rotor. The ends of the motor are closed and sealed and the bearing assemblies are retained in their recesses by means of plates 27 and 28 over which the extremities of the thin walled ends 26, 26 of the housing may be spun or staked as shown at 29. Connections for the coils 5 and 6 may be brought out through the side or ends of the housing 20.

The rotor 11 may be made of a solid piece of iron, or other magnetic and electrically conducting material, but it is preferred to use an iron rotor with a squirrel cage of copper or other electrically conducting material as shown. In the present embodiment the central portion 11 is drilled or slotted near the periphery to receive copper wires 30, and the faces of the portion 12 are recessed to accommodate copper rings 31 to which the ends of the wires are soldered or brazed.

The present construction is simple and inexpensive, requiring but few parts which may be easily assembled by unskilled persons, and provides a rugged design which is especially suited for making very small motors. It is of particular advantage in making miniature motors that each phase winding requires only a single coil which may be preformed to fit the coil recess 3, regardless of the number of field poles desired. Another feature of advantage in attaining simplicity of design and economy of construction is the end-for-end symmetry wherein the pole pieces, bearings and coils are identical in the two ends and are held in assembled relation by identically formed deformations at the ends of the casing, whereby the number of different parts and manufacturing operations is greatly reduced.

It is of course appreciated that the desired quadrature phase displacement between the currents in the coils 5 and 6 may be obtained either by connecting them directly to a two phase supply or by utilizing known systems for obtaining two phase current from single or three phase supplies. The nature of the supply source is immaterial to the present invention, provided that two phase current is ultimately fed into the coils 5 and 6.

Various changes may be made in the construction and arrangement, and it is intended that all such modifications be included in the invention, same being limited only by the scope of the appended claims. It will also be appreciated that the inherent advantages of the present construction may be obtained in large as well as in miniature machines, and it is to be understood that reference is herein made to the latter only for purposes of illustration, and not for purposes of limitation.

I claim:

1. A motor construction comprising a pair of opposed, axially aligned field pieces, each field piece being of cup shape with an annular base having inner and outer rims constituting opposite magnetic poles, a coil in the cup space between said rims, pole tips on said outer rim, motor bearings in said field pieces, and a rotor of magnetic material supported in said bearings, said rotor having an enlarged central portion disposed between said field pieces in operative relation with said pole tips and elongated end portions of appreciably reduced diameter and diminishing in diameter outwardly and terminating in end shaft portions supported in said rotor bearings and extending through said field pieces and closely adjacent said inner rims throughout substantially the entire length of said end portions with end clearance for the main body portion of said rotor so as to establish magnetic circuits through said rotor.

2. A motor construction comprising a pair of opposed, axially aligned field pieces, each field piece being of cup shape with an annular base having inner and outer rims constituting opposite magnetic poles, a coil in the cup space between said rims, pole tips on said outer rim, rotor bearings in said field pieces, a rotor of magnetic material supported in said bearings, said rotor having an enlarged central portion disposed between said field pieces in operative relation with said pole tips and elongated end portions of abruptly reduced diameter and diminishing in diameter outwardly and terminating in end shaft portions supported in said rotor bearings and extending through said field pieces and closely adjacent said inner rims throughout substantially the entire length of said end portions with end clearance for the main body portion of said rotor so as to establish magnetic circuits through said rotor, a cylindrical casing surrounding said assembly to hold the field pieces in the specified relationship.

3. A motor construction comprising a pair of opposed, axially aligned field pieces, each field piece being of cup shape with an annular base having inner and outer rims constituting opposite magnetic poles, a coil in the cup space between said rims, pole tips on said outer rim, a rotor bearing in each annular base, a rotor of magnetic material supported in said bearings said rotor having an enlarged central portion disposed between said field pieces in operative relation with said pole tips and elongated end portions of reduced diameter extending through said field pieces and closely adjacent said inner rims so as to establish magnetic circuits therethrough, external splines on said outer rims, and an internally splined tubular casing for receiving said field pieces and maintaining them in fixed relationship.

4. A motor construction comprising a pair of opposed, axially aligned field pieces, each field piece being of cup shape with an annular base having inner and outer rims constituting opposite magnetic poles, a coil in the cup space between said rims, pole tips forming external splines on said outer rim, an annular flange around said base between said splines, rotor bearings in said field pieces, a rotor of magnetic material supported in said bearings, said rotor having an enlarged central portion disposed between said field pieces in operative relation with said pole tips and elongated end portions of reduced diameter extending through said field pieces and closely adjacent said inner rims so as to establish magnetic circuits therethrough, and an internally splined tubular housing having unsplined end portions receiving said field pieces in opposite ends thereof with said flanges occupying said unsplined portions and abutting the splined ends to maintain the parts in fixed relationship.

SAMUEL BOUSKY.